Patented Feb. 27, 1945

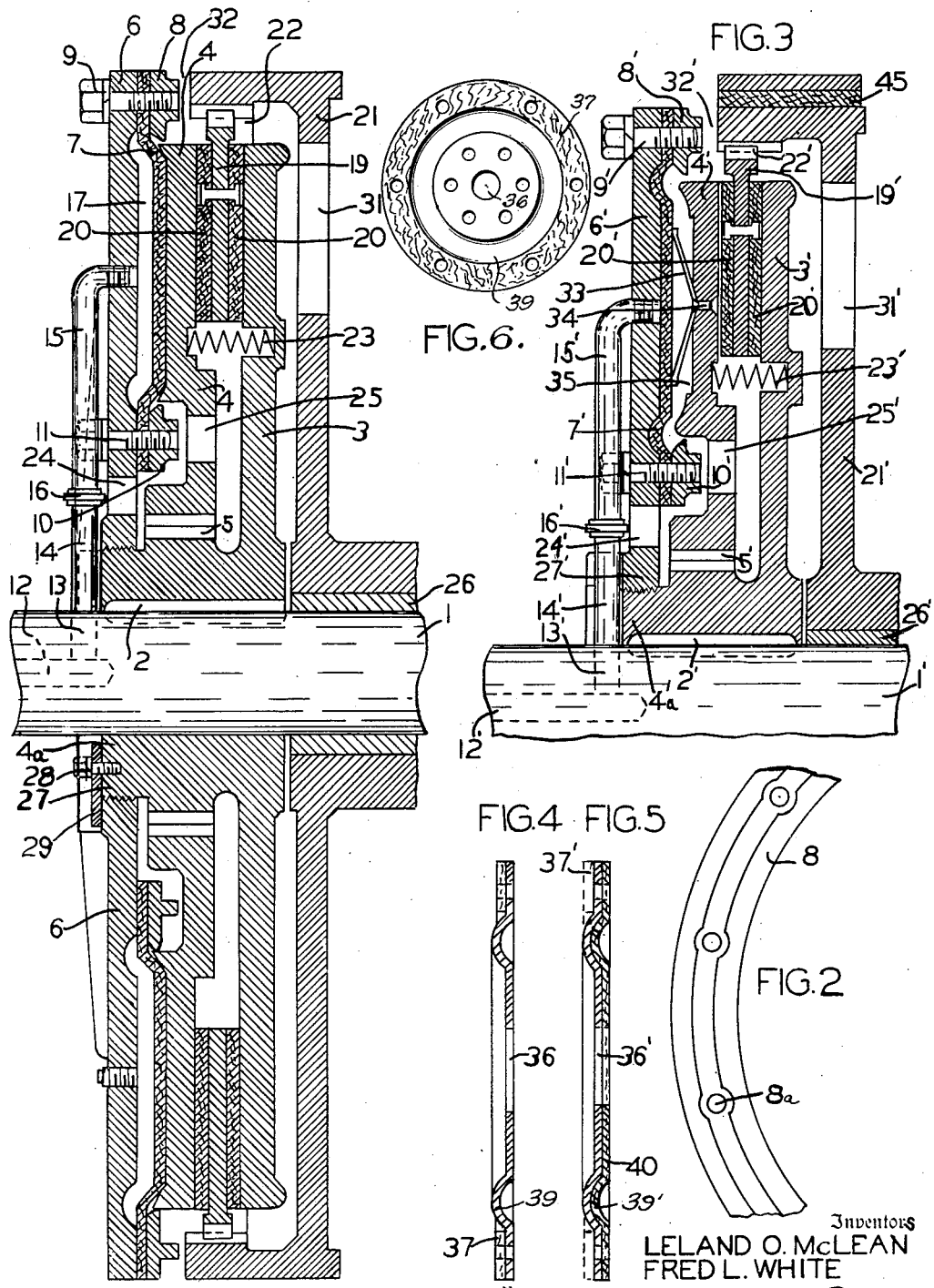

2,370,360

UNITED STATES PATENT OFFICE 2,370,360

PRESSURE FLUID CLUTCH

Leland O. McLean and Fred L. White, Marion, Ohio, assignors to The Osgood Company, Marion, Ohio, a corporation of Ohio Application November 30, 1942, Serial No. 467,440

15 Claims. (Cl. 192—88)

This invention relates to pressure fluid clutches and more particularly to a pressure fluid or hydraulically operated drive mechanism and more specifically to a drive of flexible construction for transmitting torque and for providing a driving connection between the rotatable driving and driven members concentrically disposed about a single shaft, such a mechanism as is commonly called a friction clutch and the like.

One of the objects of this invention is to provide a drive of the character described which will operate, quickly, efficiently, positively and which will retain the driving connection or disengage same quickly.

Another object is to provide a drive or clutch which requires a minimum volume of fluid with adjustment for maintaining a minimum volume of fluid by compensating for the wear on the friction lining.

Another object is to provide a flexible member or diaphragm which is under compression when the air or pressure fluid forces it against the floating driving member and frees itself automatically from the floating driving member to cool the diaphragm.

Another object of the invention is the provision of forced ventilation of the clutch or transmission mechanism.

Still another object of the invention is to provide a friction drive which is simple in design and construction, inexpensive to manufacture, conveniently assembled and serviced and which may be utilized to operate in conjunction with various forms of machinery and more particularly where space is limited requiring a clutch of narrow width and so constructed that a brake for the driven member can be mounted on the periphery of the clutch within the longitudinal confines of the clutch in such a manner as to permit of the dissipation of heat between the brake drum and the friction clutch plate, such for example as is required in power shovels, cranes and the like.

A still further object of the invention is to provide a passage positively sealed against leakage for conducting air or pressure fluid from the aperture in the shaft, about which the clutch members are concentrically disposed, to the disc-like inflatable compression chamber, there being no frictional connections requiring packing, stuffing boxes, sealing rings and the like requiring lubrication and producing wear from friction and weaving, resulting in leakage necessitating adjustments and replacements.

Other and further objects of the invention will occur to those skilled in the arts to which this invention pertains as the description proceeds which taken in connection with the accompanying drawing sets forth a preferred embodiment of the invention and selected modifications thereof but such disclosures are not to be construed as limitations of the invention which is limited only by the appended claims and any and all modifications, alterations and variations of structure coming within the spirit and scope of the invention is deemed to be included herein.

In the drawing:

Fig. 1 is a vertical sectional view through a clutch construction embodying the invention.

Fig. 2 is a plan view of a portion of one of the diaphragm retaining rings.

Fig. 3 shows a modification of the clutch structure of Fig. 1.

Fig. 4 shows a modified form of diaphragm.

Fig. 5 shows still another modified form of diaphragm.

Fig. 6 shows a plan view of the structure of Figs. 4 and 5.

The clutch or transmission unit employed on certain types of self-propelled equipment such as excavators, shovels, hoists, etc. frequently is positioned in confined spaces. Such confinement results in over heating and subjects the vital parts thereof to the deleterious effects of heat. It also renders the engagement and disengagement of the clutch a difficult problem. The foregoing objects are embodied in the disclosures subsequently described.

Referring to Figs. 1 and 2, the numerals of reference indicating the several parts of the clutch, shows a shaft 1 driven from any suitable power source (not shown) in which key 2 is inserted in a suitable key slot which connects the driving member 3 of the clutch to the shaft 1. The driving member 3 is connected to companion floating driving member 4 through the sliding spline connection at 5 and is driven in unison therewith.

Plate 6 is securely fastened to the hub 4a of the driving member 3 by means of a screw threaded connection 27. Diaphragm 7 is securely clamped to plate 6 by means of the outer clamping ring 8, shown in detail in Fig. 2, by a plurality of screws 9, only one of which is shown, and the inner clamping ring 10 and screws 11 forming an air tight compression chamber. Ring 8 has a plurality of apertures 8a therein adapted to receive the screws 9 and plate 6 is correspondingly apertured. Ring 10 is apertured in a manner similar to ring 8 as well as plate 6 to correspond thereto. . The diaphragm 7 serves as its own gasket thereby materially aiding in reducing the dimensions of the device.

A longitudinally extending conduit 12 is located in one end of the shaft 1 and communicates, near its inner end or extremity, with the radially extending conduit 13. The fluid supply line 14 is secured to the shaft 1 by means of a threaded connection with conduit 13, and is thence connected to supply line 15 by means of an air tight coupling 16 after supply line or conduit 15 has been secured to plate 6 by means of a threaded connection into the aperture provided in the plate 6 and then exhausts into the compression chamber 17.

Air of fluid under pressure, supplied from any suitable source (not shown), is conducted through conduits 12, 13, 14 and 15, and enters the compression chamber 17 actuating the diaphragm 7. The diaphragm 7 is preferably composed of high friction fibrous material or may be of a rubber like material such as "neoprene" or any other similar material. Inflation of the chamber 17 forces the floating driving member 4 to the right into engagement with the driven disc 19 and its attached friction linings or plates 20, 20 that in the instant illustration are disposed between the floating driving member 4 and its complemental driving member 3 with the disc 19 interposed between the friction linings or plates 20, 20. The pressure applied to the plates 20, 20 must be of such a degree as will overcome the load resistance and maintain a constant frictional connection between the driving members 3 and 4 and driven disc member 19. The disc 19 drives a second driven member 21 through the spline or sliding tooth connection at 22.

When the air or pressure fluid is released, by means of a suitable variable pressure control valve (not shown), in pressure chamber 17, a plurality of springs 23 (only one of which is shown) uniformly spaced about the disc on a common radius speedily separating the driving members 3 and 4 from driven element 19 thereby effecting a quick release of the connection between the said driving and driven members of the clutch. The disengagement action of the springs 23 is assisted by the inherent resiliency of the diaphragm 7 and upon the exhaust of the compressed air or pressure fluid from the chamber returns the floating driving member 4 and the diaphragm 7 to their at rest positions occupied before compressed air or pressure fluid was admitted to the pressure chamber 17.

The return travel of the floating driving member 4 from clutch element 20 is less than the return travel of the diaphragm 7 so that during clutch disengagement there is space between the diaphragm 7 and the driving member 4 which permits cooling by reason of the fact that air is drawn through the apertures 24 in plate 6 and 25 in the plate 4 and impinges against the driving member 3 and is forced over plates 20, 20 and against the friction face of plates or discs 3 and 4 and is then exhausted into space by the centrifugal force generated by the rotating driving members through aperture 31 and through radial opening 32.

The bushing or bearing 26 permits shaft 1 to rotate freely with respect to the driven member 21 during clutch disengagement.

The screw connection at 27 between plate 6 and the hub 4a of element 4 permits a compensation or take up of wear on the friction linings 20, 20 and also to maintain at a minimum the volume of air or pressure fluid necessary to operate the clutch. The connection between the plate 6 and hub 4a is made secure upon adjustment by a locking screw 28 and a plate or ring 29.

A clutch construction embodying the present invention has numerous advantages which render it useful in the drive mechanism for many machines. The flexible and elastic actuating mechanism permits a slight misalignment of the driving and driven parts while maintaining a uniform and equally distributed pressure drive connection throughout its 360° application without a wearing action in the air or pressure fluid sealing joints.

A modified form of the invention is shown in Fig. 3 in which similar parts bear the numerals of Fig. 1 but in which said numerals are primed. In order to provide for a positive disengagement of the diaphragm 7' from the element 4' a series of springs 33, only one of which is disclosed, is provided. These springs may be in the form of webs that in the engaged position of the clutch are seated in appropriate sockets 35 formed in the engaging face of element 4'. The springs are retained in position by a holding means 34 which may be a rivet or other appropriate device. There will be a small amount of friction between the webs of springs 33 and the diaphragm 7' but that is small in comparison to the possible frictional engagement in the device of Fig. 1.

The use of the springs 33 greatly increase the cooling effect of the device in that another clear path is provided between diaphragm 7' and the driven element 4'. The other cooling channels operate in the manner described in connection with Fig. 1 and the same applies to the overall operation of the device. A brake element 45 is shown in Fig. 3 operable by any suitable mechanism (not shown) is adapted to arrest motion of element 21'.

Modified forms of the diaphragm are shown in Figs. 4 and 5 which may be substituted for the diaphragm 7 of Fig. 1 and 7' of Fig. 3. The device of Fig. 4 comprises a disc element 36 made up of a thin section metal, preferably spring steel, and has a ring gasket 37 insertible between disc 6 or 6' and diaphragm 36. The flexing of the disc 36 to bring it into engagement with element 4 or 4' takes place about portion 39 and because of the natural resiliency of the disc 36 to assume its position shown in Fig. 4 will cause it to positively disengage from the driven element 4 or 4'. No change in the operation of the device occurs by the substitution of a disc similar to or like 36.

The disclosure of Fig. 5 is similar to that of Fig. 4 except that the friction surface thereof that engages driven element 4 or 4' is lined with a suitable friction element 40 to avoid a metal to metal contact and prevent noise and any possible relative movement between the parts. This is shown as relatively thick but is preferably made as thin as possible. A gasket 37' shown in dotted lines may also be provided.

It is thus evident that means are provided for definitely disengaging the several diaphragms and that the axial travel thereof relative to the axis of shaft 1 and 1' is much greater than the coaxial travel of the elements 4 and 4' and providing a decided cooling effect as well as a quick, certain and positive engagement when the clutch is engaged or locked by pressure fluid acting against diaphragms 7, 7', 36 or 36', 40.

That which is regarded new, novel and useful and which is sought to be protected by Letters Patent of the United States is as follows:

1. In a clutch of the character described concentrically disposed about a single shaft, a driving member fixed thereon; a longitudinally floating companion driving member driven by the first said member; a driven member including a floating annulus disposed between said driving members; a disc-like inflatable air tight compression chamber with a flexible wall being under compression when pressure fluid is admitted to said compression chamber for inflating the said disc-like chamber to thereby force said floating driving member longitudinally towards the said driving member, progressively and in proportion to the amount of pressure supplied, thus compressing the floating annulus of the driven member between the said driving members causing the driven member to rotate progressively or at variable speeds from static to unison with the driving members; a series of compression springs disposed between the said driving members for freeing the floating annulus of the driven member and forcing said floating driving member to its original clutch disengagement position, the return travel being less than the return travel of the said flexible compression wall, due to its inherent resiliency, providing space between the said floating driving member and said flexible compression chamber wall; said driving members provided with apertures to admit and pass an air stream to cool said driving and driven members; and means for adjusting the disc-like inflatable airtight compression chamber relatively of said annulus to compensate for wear of the clutch lining on the floating annulus of the driven member.

2. In a transmission mechanism; a shaft; a driving element fixed to said shaft having an extended hub; a floating element splined to the hub of said driving element; a driven element journaled on said shaft; means splined to said driven element at its periphery and adapted to frictionally engage said driving element and said floating element; a disc adjustably secured to said driving element; a flexible diaphragm element secured to said disc and forming an inflatable chamber therewith adapted to engage said floating element to urge said driving element and the floating element thereon into engagement with said driven element; and means to cause said floating member to retract from said driven member on said splined means upon deflation of said inflatable chamber; said flexible diaphragm being inherently resilient and causing it, because of its resiliency, to retract a greater distance than the floating element, said adjustable disc varying the clearance between said flexible diaphragm and said floating element.

3. In a transmission element; a shaft; a driving member fixed to said shaft having an extended hub; a driven member journaled on said shaft; a shiftable element splined to said driven member and having a friction surface engageable with said driving member, said shiftable element and said driven member splined at their peripheries; a floating element splined to the hub of said driving member; said shiftable element having a friction surface engageable with said floating member; one of said driving members provided with apertures to admit and pass an air stream to cool said driving and driven members; a disc mounted on the hub of said driving member; a flexible diaphragm secured to said disc to form an inflatable chamber with said disc, said diaphragm upon inflation urging said floating member, said shiftable member and its friction surfaces and said driving member into engagement to rotate as a unit; and spring means to separate said members upon deflation of said chamber; said diaphragm moving a greater distance axially of said shaft than said floating member because of its inherent resiliency.

4. In a clutch device; a shaft having a member fixed thereto, said member provided with an extended hub; a driven member journalled on said shaft; a shiftable means having friction surfaces thereon associated with said journalled member by a splined connection at the peripheries of said means and said journalled member, one of said friction surfaces adapted to engage said member; a floating member splined to the hub of said member and adapted to engage the other one of said friction surfaces; a disc-like member on said hub having a highly resilient diaphragm thereon forming an inflatable chamber with said disc-like member engageable with said floating member upon inflation of said inflatable chamber; said inflatable chamber upon inflation urging said floating member, said shiftable means and said member into engagement; means to disengage said engaged elements upon deflation of said inflatable chamber; and said diaphragm and said floating member so constructed and arranged that said diaphragm by reason of its high resiliency moves a greater axial distance relative to said shaft than said floating member.

5. In a transmission element; a rotatable shaft; a member provided with an extended hub fixed thereon; a second member journalled thereon; a third member splined at its periphery to said second member and having a pair of friction elements fixed thereon, one of said elements adapted to engage said member; a floating element splined to the hub of said member and engageable with the other of said friction elements; a disc adjustably secured to said hub; a flexible resilient diaphragm fixed to said disc and forming a chamber therewith, said chamber upon inflation causing said member and said floating element to engage said third member; and means to cause said floating element and said member to disengage upon deflating of said chamber; said diaphragm because of its resiliency moving a greater distance axially of said shaft than said floating element, said disk adjustably mounted to vary the clearance between said diaphragm and said third member.

6. In a clutch; a rotatable shaft; a first member fixed thereto; said member having a hub extending axially of said shaft; a second member journalled on said shaft; means adapted to connect said first and second members; a third member associated with said first member and in a floating relation; a disc mounted on said hub; a flexible resilient diaphragm fixed to said disc and forming an inflatable chamber therewith, said chamber upon inflation causing said means and said first and third members to engage to drive said second member; means to disengage said engaged members and means after deflation of said chamber; said diaphragm moving a greater distance axially of said shaft than said third member; and said disc adjustable on said hub to vary the return travel or axial movement of said diaphragm.

7. In a clutch organization; a rotatable shaft; a first member fixed thereto having an extended hub; a second member journaled on said shaft; a third member supported by said second member and engageable with said first member, said second and third members spline connected at their peripheries; a floating member associated with said first member and adapted to rotate therewith, said floating member splined to the hub of said first member; a disc element associated with said first member; a thin walled resilient metal diaphragm secured to said disc and forming a chamber therewith; said chamber upon inflation urging said floating member, said first and third members into engagement to rotate said second member; means to disengage the several members upon deflation of said chamber; said diaphragm upon deflation returning to its retracted position and traveling a greater distance axially of said shaft than said floating member, said disc element adjustably mounted on said hub to vary the clearance between said diaphragm and said floating member.

8. In a clutch organization; a rotatable shaft; a first member fixed thereto having an extended hub; a second member journalled on said shaft; a third member splined to said second member and engageable with said first member, said second and third members splined at their peripheries; a floating member associated with said first member and engageable with said third member, said floating member splined to said hub; a disc adjustably mounted on said first member; a resilient diaphragm fixed to said disc and forming an inflatable chamber therewith and engageable upon inflation with said floating member; said adjustably mounted disc varying the distance between said diaphragm and said floating member said chamber upon inflation causing said floating member to engage with said third member and said third member with said first member; means to separate said engaged members upon deflation of said chamber; and means to cause said diaphragm and said floating members to positively separate upon deflation of said chamber.

9. In a clutch organization; a rotatable shaft; a first member having an extended hub keyed thereto; a second member rotatably mounted on said shaft; a third member associated with said second member and engageable with said first member, said second member having an internally splined flange engaging exterior splines on said third member; a fourth member splined to the hub of said first member and adapted to engage said third member; a disc mounted on said first member; a flexible diaphragm fixed to said disc and forming an inflatable chamber therewith; said adjustable disc varying the distance between said diaphragm and said fourth member; said chamber upon inflation causing said first, third and fourth members to engage; means to disengage said members upon deflation of said chamber; said disc, said fourth member and said second members having apertures therethrough for the passage of air drawn through said apertures and forced over said clutch surfaces in the disengaged position thereof by the centrifugal action of said clutch members to thereby ventilate said clutch engaging members.

10. In a clutch organization; a rotatable shaft; a first member fixed thereto; a second member journalled on said shaft and having a flange portion coaxial with said first member; a third member splined in said flange and having a friction surface engageable with said first member; a floating member associated with said first member engageable with a second friction surface on said third member; a disc fixed to said first member; a resilient extensible diaphragm fixed to said disc and forming an inflatable chamber therewith; said chamber upon inflation causing said floating member, said first and third members to engage; means to separate said engaged members upon deflation of said chamber; means to cause said diaphragm and said floating member to separate; apertures formed in said disc and floating members to allow the passage of air therethrough and to pass over the engaging surfaces of said members when they are disengaged to cool same and to exhaust through an aperture in said second member and through the radial space between said disc and said flange; said air forced through said clutch by the rotative movement of said clutch members.

11. In a device as set forth in claim 3 in which said diaphragm comprises a flexible extensible fabric element.

12. In a device as defined in claim 4 in which said diaphragm comprises a thin walled spring like disc element having a corrugation concentrically formed therein.

13. In a device as defined in claim 5 in which said diaphragm comprises a flexible spring disc having an anti-friction element associated therewith having a corrugation concentrically formed therein, said anti-friction element adapted to engage said floating element and to prevent noise and wear.

14. In a device as defined in claim 5 which includes means to cause said diaphragm and said floating member to separate upon deflation of said chamber.

15. In a device as defined in claim 5 in which said floating member and said disc have apertures therein to pass air therethrough by the centrifugal action of the clutch elements and in which said air passes over said clutch engaging elements during clutch disengagement to cool same and exhausting said air through an aperture in said second member and radially of said disc member.

LELAND O. McLEAN.
FRED L. WHITE.